United States Patent [19]

Virtanen

[11] Patent Number: 6,063,423
[45] Date of Patent: May 16, 2000

[54] METHOD FOR PREPARING A FOOD PORTION

[76] Inventor: Pekka Virtanen, Mattaksenkuja 4, Vantaa 01390, Finland

[21] Appl. No.: 08/952,535

[22] PCT Filed: May 7, 1996

[86] PCT No.: PCT/FI96/00258

§ 371 Date: Nov. 7, 1997

§ 102(e) Date: Nov. 7, 1997

[87] PCT Pub. No.: WO96/37111

PCT Pub. Date: Nov. 28, 1996

[30] Foreign Application Priority Data

May 22, 1995 [FI] Finland .................................. 952486

[51] Int. Cl.⁷ ............................................... A23B 4/10
[52] U.S. Cl. ............................. 426/302; 426/89; 426/92; 426/100; 426/303; 426/305; 426/393; 426/524
[58] Field of Search ................................ 426/89, 92, 100, 426/129, 302, 303, 393, 410, 524, 305

[56] References Cited

U.S. PATENT DOCUMENTS

| 1,489,144 | 4/1924 | Ogura et al. ......................... 426/310 |
| 2,504,869 | 4/1950 | Noyes ....................................... 426/68 |
| 3,808,340 | 4/1974 | Palmer ..................................... 426/92 |
| 3,808,342 | 4/1974 | Brandin ................................... 426/565 |
| 5,266,340 | 11/1993 | Samson et al. ........................ 426/92 |

FOREIGN PATENT DOCUMENTS

| 0 091 497 | 10/1983 | European Pat. Off. . |
| 2 134 175 | 1/1973 | Germany . |
| 21 45 930 | 9/1983 | Germany . |
| 1 448 495 | 9/1976 | United Kingdom . |

OTHER PUBLICATIONS

Hirabayashi, Katsumasa; Patent Abstracts of Japan; vol. 10, No. 71, C–334; abstract of JP, A, 60–210944, Oct. 23, 1985.
Yamagishi, Masanatsu; Patent Abstracts of Japan; vol. 10, No. 182, C–356; abstract of JP, A, 61–31038, Feb. 13, 1986.

*Primary Examiner*—Milton Cano
*Attorney, Agent, or Firm*—Altera Law Group LLC

[57] ABSTRACT

A method for preparing a food portion where the food portion is frozen to a temperature of at least −15° C. a first fat containing layer is applied onto the surface of the food portion and the layer frozen as a first gravy layer, and a second layer of a fat-free liquid is applied onto the first layer and the second layer frozen to inhibiting oxidation of the first layer.

11 Claims, No Drawings

METHOD FOR PREPARING A FOOD PORTION

FIELD OF THE INVENTION

The present invention concerns a procedure, for preparing a ready-made food portion.

BACKGROUND OF THE INVENTION

Various procedures for preparing deep-frozen ready-made foods are known in the art. For instance, the reference FI 76676 discloses a method for preparing a deep-frozen fish product, wherein a deep-frozen piece of fish is first coated with dough, rolled in egg and bread crumbs a first time, submerged in liquid food fat, and rolled in egg and bread crumbs once more before being deep frozen.

In GB 1,448,495 a procedure is disclosed for applying a seasoned gravy formulation on frozen food products. In said procedure, the foodstuff is frozen and upon the frozen foodstuff, the ready-made gravy is applied in the form of an aqueous suspension. Hydro-colloid gravy having a certain viscosity is used in this procedure.

The reference U.S. Pat. No. 5,266,340 describes the preparation of dough-enclosed frozen products. In this procedure the foodstuffs are portioned, coated with dough, and the dough is allowed to form a matrix of protein and starch, which protects the foodstuff.

In reference SE 374 995 a method is disclosed for producing a frozen foodstuff, wherein a gravy containing fat is sprayed on the foodstuff, frozen or at room temperature, whereupon the product is frozen.

The problem with procedures known in the art is that the fats and oils used to coat the foodstuff are in spite of deep freezing subject to oxidation and give the product an unsatisfactory flavour.

A further problem with previously known procedures is that in spite of the methods employed, liquid will evaporate from the deep-frozen foodstuff; so-called deep-freeze drying takes place.

Moreover, fats and oils render the surface of the foodstuffs sticky and awkward to handle, whereby their packaging e.g. in bags becomes difficult. Furthermore, existing procedures are not usable on any and all types of foodstuff. Moreover, losses of liquid and of weight occur at deep freezing and in food preparing, and the flavour of the food will suffer.

SUMMARY OF THE INVENTION

The object of the invention is to eliminate the drawbacks mentioned. The object of the invention is specifically to disclose a foodstuff preparing procedure in which the product is protected against deep-freeze drying and oxidation. The object of the invention is furthermore to disclose a procedure by which tasty and healthy food is obtained.

It is still another object of the invention to disclose a procedure enabling a product to be made which is neatly, simply and swiftly packageable and which can be made into food with ease and speed.

In the procedure of the invention, in order to prepare ready-made food portions, the portion piece is frozen to a temperature at least −15° C., and the gravy is frozen upon the portion piece in at least two different layers so that the outer layer is an oxidation-inhibiting, fat-free liquid layer.

The component layers can be applied on the portion piece by spraying, by atomizing or by dipping the frozen portion piece in the gravy or liquid.

In the procedure of the invention the portion piece is advantageously either a whole piece of meat, fish, broiler meat or another foodstuff; or the portion piece is already cut into cubes or strips, or minced; in such case the comminuted particles may be precooked/roasted so that they might not stick to each other during the actual cooking/roasting.

The portion piece to be used in the procedure of the invention may be thermally treated or raw, in which case the consumer himself will prepare the food portion, or the portion piece may be fully cooked/roasted.

The gravy which is formed by the procedure is applied to the ready-made food portion either in the form of components, whereby the liquid separating from the product may be utilized in forming the gravy, and thus there will be no losses of liquid, weight or flavour during the preparation of food.

The invention affords the advantage that the layer containing fat-free liquid which gets to be top-most will protect the product against oxidation and will constitute part of the gravy accompanying the food.

It is a further advantage of the invention that, thanks to the fat-free coating layer, the product can be easily and neatly packaged.

Further, thanks to the invention, the food will be tasty and fresh because the food portion is not prepared and finished until in the consumer's oven or microwave oven.

It is a further advantage of the invention that all particles of the gravy are not combined until at the food preparing stage, whereby all liquid, flavour and other constituents present can be fully utilized without losses.

DETAILED DESCRIPTION OF PREFERRED EMBODIMENTS

In an embodiment of the procedure of the invention the gravy is formed of layers, upon the frozen portion piece being first applied vegetable oil, milk fat (butter), etc. congealing above 0° C., and which may be seasoned or unseasoned. Upon this is applied a liquid layer, which may contain wheat flour, starch or any other material thickening at a temperature higher than +70° C., and gelatine, to inhibit the running of liquids between +0 and +30° C. Upon this is applied a layer inhibiting oxidation which may be thickened, may contain gelatine or may be just liquid.

The oxidation-inhibiting protective liquid layer, which may consist of water, meat, fish, chicken, vegetable or fruit broth, etc., may contain material congealing under cold above +0° C., such as gelatine or equivalent, to bind the liquid exuding from the portion piece in the range of +0 to +30° C. The antioxidant liquid may also contain material thickening at a temperature in excess of +70° C., such as wheat flour, starch, etc., to bind the muscle fluid exuding from the portion piece and to aid the production of gravy.

In an embodiment of the procedure of the invention, a broiler, meat or fish portion piece is seasoned and refrigerated to a temperature at least about −15° C. (preferably below −25° C.) with liquid nitrogen or by conventional deep-freezing methods. When the portion piece is seasoned at this stage, the spices will adhere better to the portion piece, and the piece will be better seasoned. On a conveyor belt, a lower gravy layer is sprayed upon the portion piece and it will immediately freeze fast to the surface of the portion piece. Next, a layer of fat-free chicken, meat, fish or other broth, to which has been added gelatine, maize meal or any other thickening substance, is sprayed upon the portion piece. The fat-free layer inhibits oxidation and protects the foodstuff. The fat-free liquid which is added may equally be just water.

In an embodiment of the procedure of the invention, together with the portion piece are frozen the other solid materials belonging to the portion (vegetables, etc.), the food is seasoned, a lower gravy layer is frozen upon the portion piece by spraying or by dipping the portion piece in the gravy; this gravy may contain:

(a) vegetable oil congealing above 0° C., or milk fat, seasoned e.g. with garlic (b) pre-cooked/fried onion 10 to 40%, paprika 10 to 40%, tomato 10 to 40%, vegetable oil 5 to 20 %, salt, sugar or other sweetening agents, spices.

The lower gravy layer may be thickened and it may contain gelatine. Upon the frozen lower gravy layer, a fat-free liquid layer is applied either by spraying or liquid.

The frozen portion piece is hereafter packaged in a bag or in a shaped portion box tolerating both deep-freezing and heating.

In the procedure of the invention, the gravy may equally be applied on the ready-made food portion in such manner that the thickening material and part of the liquid going to make the gravy are frozen together with the other constituents, if any, of the gravy (green vegetables, fruit, smoked bacon, cray-fish meat, mushrooms, etc.) and with the spices and the portion piece, and the additional liquid of the gravy is separately applied upon the frozen components; hereby the gravy will not be completed until in connection with preparation of the food portion for serving.

The frozen portion piece may prior to adding the various layers be even further rapidly refrigerated with liquid nitrogen, e.g. by swiftly dippinig it in liquid nitrogen. In this way the surface of the portion piece can be caused to be very colk, and the gravy and the different layers will freeze onto the surface of the portion piece as rapidly as possible.

The frozen portion piece, and which is free of fat on its surface, can be packaged with ease in a bag or in a shaped portion box tolerating both deep-freezing an heating. One or several portion pieces can be packed in one portion bag or box.

The ready-made food portion enclosed in a portion bag or box can be finally prepared in the oven or microwave oven, rapidly and hygienically.

The invention is not exclusively delimited to concern the embodiment examples presented in the foregoing: numerous modifications are feasible within the scope of the inventive idea defined by the claims.

What is claimed is:

1. A method for preparing a food portion, comprising:
providing a portion piece frozen to at least −15° C.;
applying a first fat containing layer to be frozen onto a surface of the portion piece as a first gravy layer; and
applying a second layer over the first layer to be frozen onto the first layer as a second layer, the second layer being a fat-free liquid layer inhibiting oxidation.

2. The method according to claim 1, comprising spraying the first and second layers on the portion piece.

3. The method according to claim 1, wherein the first and second layers are formed by dipping the portion piece.

4. The method according to claim 1, further comprising seasoning the portion piece prior to freezing.

5. The method according to claim 1, further comprising selecting the portion piece from the group consisting of broiler, meat, and fish.

6. The method according to claim 1, further comprising selecting the portion piece from the group consisting of raw foods, thermally treated foods, fully cooked foods, and fully roasted foods.

7. The method according to claim 1, wherein the first gravy layer on the portion piece includes at least one of fat and oil.

8. The method according to claim 7, further comprising providing the second gravy layer with thickener.

9. The method according to claim 1, wherein the fat-free liquid layer includes at least one of chicken broth, meat broth, fish broth, vegetable broth, fruit broth and water.

10. The method according to claim 1, wherein the second layer includes at least one of gelatin, wheat flour and maize meal.

11. The method according to claim 1, further comprising packaging the portion piece in one of a bag, a portion box, and a package that is freezable and heatable.

* * * * *